United States Patent
Eck et al.

(10) Patent No.: US 6,191,235 B1
(45) Date of Patent: *Feb. 20, 2001

(54) PROCESS FOR THE PREPARATION OF A REDISPERSIBLE DISPERSION POWDER COMPOSITION

(75) Inventors: Herbert Eck; Klaus Adler; Heinrich Hopf, all of Burghausen; Franz Jodlbauer, Marktl; Dieter Gerhardinger, Burghausen, all of (DE)

(73) Assignee: Wacker-Chemie GmbH, Munich (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/682,671

(22) PCT Filed: Jan. 26, 1995

(86) PCT No.: PCT/EP95/00282

§ 371 Date: Oct. 3, 1996

§ 102(e) Date: Oct. 3, 1996

(87) PCT Pub. No.: WO95/20627

PCT Pub. Date: Aug. 3, 1995

(30) Foreign Application Priority Data

Jan. 27, 1997 (DE) .................................. 44 02 409

(51) Int. Cl.$^7$ .................................. C08F 8/00; C08F 8/42
(52) U.S. Cl. .................. 525/342; 524/265; 524/266; 524/268; 524/269; 524/369; 525/329.5; 525/329.7; 525/330.3; 525/330.7; 525/331.9; 525/333.3
(58) Field of Search .................. 524/369, 265, 524/266, 268, 269; 525/329.5, 329.7, 330.3, 330.7, 331.9, 333.3, 342

(56) References Cited

U.S. PATENT DOCUMENTS

| | | | |
|---|---|---|---|
| 4,704,416 | * 11/1987 | Eck et al. | 524/50 X |
| 5,169,888 | * 12/1992 | Sales | 524/269 |
| 5,202,368 | * 4/1993 | Davies et al. | 524/266 |
| 5,214,095 | * 5/1993 | Lavoie | 524/806 |
| 5,216,057 | * 6/1993 | Pratt et al. | 524/269 |
| 5,416,181 | * 5/1995 | Nguyen et al. | 527/300 |
| 5,578,668 | * 11/1996 | Colombet et al. | 524/265 |

FOREIGN PATENT DOCUMENTS

| | | | |
|---|---|---|---|
| 0228657 | 7/1987 | (EP) . | |
| 0493168 | 7/1992 | (EP) . | |
| 0279373 | 4/1993 | (EP) . | |
| 927517 | * 5/1963 | (GB) | 524/269 |
| 173172 | * 9/1985 | (JP) | 524/269 |
| 723315 | * 5/1980 | (SU) | 524/269 |
| 878750 | * 11/1981 | (SU) | 424/269 |
| 933688 | * 6/1982 | (SU) | 524/269 |

OTHER PUBLICATIONS

English Derwent Abstract AN 92–219270.
Houben–Weyl, Methoden der organischen Chemie, vol. E20, p. 1782 et seq. 2219 et seq., Georg Thieme Verlag, Stuttgart, 1987.
Houben–Weyl, Methoden der organischen Chemie, vol. XIV,1, Makromolekulare Stoffe, p. 192–208, Georg Thieme Verlag, Stuttgart 1961.

\* cited by examiner

Primary Examiner—Judy M. Reddick
(74) Attorney, Agent, or Firm—Burgess, Ryan & Wayne; Milton J. Wayne; William R. Moran

(57) ABSTRACT

The invention concerns a dispersion powder composition which is redispersible in water and is made from water-insoluble organic polymers, the composition being characterized in that it contains 0.1 to 30% by wt., relative to the weight of the organic polymers, of one or more silicon compounds which are dispersible in water and which have a boiling point at normal pressure of 160° C., selected from the group comprising the silanes, polysilanes, oligosiloxanes, carbosilanes, polycarbosilanes, carbosiloxanes, polycarbosiloxanes and polysilylenedisiloxanes. The invention also concerns methods for manufacturing such compositions and their use.

2 Claims, No Drawings

PROCESS FOR THE PREPARATION OF A REDISPERSIBLE DISPERSION POWDER COMPOSITION

BACKGROUND OF THE INVENTION

1. Field of the Invention

The invention relates to a dispersion powder composition which is redispersible in water and is based on water-insoluble polymers, process for its preparation and its use.

2. Background Art

Dispersion powder compositions which are redispersible in water and are based on homo- or copolymers are known. Such a dispersion powder composition is prepared by spray drying the corresponding aqueous plastics dispersions in a stream of hot air. The dispersion powders are suitable as additives to hydraulic binders in the building materials industry, and such products are furthermore employed as binders in coating compositions or in adhesives.

EP-A 228657 (U.S. Pat. No. 4,704,416) describes dispersion powders which are redispersible in water and are based on water-soluble polymers, and which comprise organic silicon compounds, preferably organopolysiloxanes. The dispersion powders are prepared by spray drying an emulsion of the organic silicon compound in an agueous solution of the water-soluble polymer.

EP-B 279373 relates to powders which are redispersible in water and comprise organopolysiloxane, and which additionally comprise a water-soluble, film-forming polymer. They are prepared by spray drying the acueous mixtures of the constituents mentioned.

EP-A 493168 relates to dispersion powders which are redispersible in water and are based on film-forming, water-insoluble vinyl or acrylic polymers, and which comprise silicones, more precisely organosiliconates and/or organopolys-loxanes. They are prepared by sprav drying aqueous dispersions of the vinyl or acrylic polymers, to which silicones have been added before the spraying.

SUMMARY OF THE INVENTION

The invention is based on the object of providing dispersion powder compositions which are redispersible in water and are based on water-insoluble polymers, and which are modified with organosilicon compounds.

The invention relates to a dispersion powder composition which is redispersible in water and is based on water-insoluble organopolymers, wherein the powder composition comprises 0.1 to 30% by weight, based on the organopolymer content, of one or more water-dispersible silicon compounds having a boiling point under normal pressure of >160° C., from the group consisting of silanes, polysilanes, oligosiloxanes, carbosilanes, polycarbosilanes, carbosiloxanes, polycarbosiloxanes and polysilylenedisiloxanes.

DESCRIPTION OF THE PREFERRED EMBODIMENTS

Suitable water-insoluble organopolymers are: homo- and copolymers which are in the form of an aqueous dispersion or which can be converted into an aqueous dispersion, and which, if appropriate at elevated temperature and/or in an alkaline medium, form a solid film after drying on and, if appropriate, hardening. The average particle size of the dispersion powder particles is in general 1 to 1000 $\mu$m, preferably 10 to 700 $\mu$m, particularly preferably 50 to 500 $\mu$m.

Preferred water-insoluble polymers are: vinyl ester homo- or copolymers containing one or more monomer units from the group consisting of vinyl esters of unbranched or branched alkylcarboxylic acids having 1 to 15 C atoms;

(meth)acrylic acid ester homo- or copolymers containing one or more monomer units from the group consisting of methacrylic acid esters and acrylic acid esters of unbranched or branched alcohols having 1 to 12 C atoms; homo- or copolymers of fumaric and/or maleic acid mono- or diesters of unbranched or branched alcohols having 1 to 12 C atoms;

homo- or copolymers of dienes, such as butadiene or isoprene, and of olefins, such as ethene or propene, it being possible for the dienes to be copolymerized, for example, with styrene, (meth)acrylic acid esters or the esters of fumaric or maleic acid; homo- or copolymers of vinyl aromatics, such as styrene, methylstyrene or vinyltoluene;

homo- or copolymers of vinyl-halogen compounds, such as vinyl chloride.

where appropriate, water-insoluble, film-forming polyaddition and polycondensation polymers, such as polyurethanes, polyesters, polyethers (excluding polyethylene oxide), polyamides, melamine-formaldehyde resins or phenol-formaldehyde resins, if appropriate also in the form of their oligomeric precursors, are also suitable.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of $\alpha$-branched monocarboxylic acids having up to 10 C atoms, for example VeoVa9$^R$ or VeoVa10$^R$. Vinyl acetate is particularly preferred.

Preferred methacrylic acid esters or acrylic acid esters are methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate, 2-ethylhexyl acrylate. Methyl acrylate, methyl methacrylate, n-butyl acrylate and 2-ethylhexyl acrylate are particularly preferred.

Preferred ester groups of fumaric and maleic acid are the methyl, ethyl, n-propyl, iso-propyl, n-butyl, iso-butyl, t-butyl, hexyl, ethylhexyl and dodecyl group.

If appropriate, the vinyl ester copolymers can comprise 1.0 to 65% by weight, based on the total weight of the comonomer phase, of $\alpha$-olefins, such as ethylene or propylene, and/or vinyl aromatics, such as styrene, and/or vinyl halides, such as vinyl chloride, and/or acrylic acid esters or methacrylic acid esters of alcohols having 1 to 10 C atoms, such as methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate and 2-ethylhexyl acrylate and/or ethylenically unsaturated dicarboxylic acid esters or derivatives thereof, such as diusopropyl fumarate, or the dimethyl, methyl t-butyl, di-n-butyl, di-t-butyl and diethyl ester of maleic acid or fumaric acid, or maleic anhydride.

If appropriate, the (meth)acrylic acid ester copolymers can comprise 1.0 to 65% by weight, based on the total weight of the comonomer phase, of $\alpha$-olefins, such as ethylene or propylene, and/or vinyl aromatics, such as styrene, and/or vinyl halides, such as vinyl chloride and/or ethylenically unsaturated dicarboxylic acid esters or derivatives thereof, such as diisopropylfumarate or the dimethyl, methyl t-butyl, dibutyl and diethyl esters of maleic acid or fumaric acid, or maleic anhydride.

In a preferred embodiment, the vinyl ester copolymers and the (meth)acrylic acid ester copolymers also comprise 0.05 to 10.0% by weight, based on the total weight of the comonomer mixture, of auxiliary monomers from the group consisting of ethylenically unsaturated carboxylic acids, preferably acrylic acid or methacrylic acid; from the group consisting of ethylenically unsaturated carboxylic acid amides, preferably acrylamide; from the group consisting of ethylenically unsaturated sulfonic acids and salts thereof, preferably vinylsulfonic acid; and/or from the group consisting of polyethylenically unsaturated comonomers, for example divinyl adipate, diallyl maleate, allyl methacrylate or triallyl cyanurate. Suitable auxiliary monomers are also comonomers having a crosslinking action, for example acrylamidoglycolic acid (AGA), methacrylamidoglycolic acid methyl ester (MAGME), N-methylolacrylamide (NMAA), N-methylolmethacrylamide, allyl N-methylolcarbamate and alkyl ethers, such as the isobutoxy ether, or esters of N-methylolacrylamide, of N-methylolmethacrylamide or allyl N-methylolcarbamate.

Corresponding statements to those for the (meth)acrylic acid ester copolymers apply to the copolymers of esters of maleic or fumaric acid.

The water-insoluble polymers mentioned which can be polymerized by free radicals are preferably prepared by the emulsion polymerization process. The polymerization can be carried out discontinuously or continuously, with or without the use of seed latices, with initial introduction of all the constituents or individual constituents of the reaction mixture, or with initial introduction of a portion and subsequent metering of the constituents or individual constituents of the reaction mixture, or by the metering method without an initial mixture. All the meterings are preferably carried out at the rate of consumption of the particular component. The polymerization is preferably carried out in a temperature range from 0 to 100° C., and is initiated using the methods usually employed for emulsion polymerization. The initiation is carried out by means of the customary, water-soluble agents which form free radicals, which are preferably employed in amounts of 0.01 to 3.0% by weight, based on the total weight of the monomers. All the emulsifiers and/or protective colloids usually used in emulsion polymerization can be employed as dispersing agents.

If appropriate, up to 6% by weight, based on the total weight of the monomers, of emulsifier is employed. Possible emulsifiers here are both anionic and cat-onic as well as nonionic emulsifiers, if these are insoluble in the protective colloid. Protective colloids are preferably employed, particularly preferably in amounts of up to 15% by weight, based on the total weight of the monomers. Examples of these are polyvinyl alcohols and derivatives thereof; such as vinyl alcohol/vinyl acetate copolymers, polyvinylpyrrolidones; polysaccharides in water-soluble form, such as starches (amylose and amylopectin), cellulose, guar, tragacanthic acid, dextran, alginates and carboxymethyl, methyl, hydroxyethyl and hydroxypropyl derivatives thereof; proteins, such as casein, soya protein and gelatin; synthetic polymers, such as poly(meth)acrylic acid, poly(meth)acrylamide, polyvinylsulfonic acids and water-soluble copolymers thereof; melamlne-formaldehydesulfonates, naphthalene-formaldehydesulfonates, and styrene/maleic acid and vinyl ether/maleic acid copolymers. In the most preferred embodiment, the polymerization is carried out with a protective colloid and without addition of an emulsifier.

Suitable water-dispersible silicon compounds from the group consisting of silanes, polysilanes, oligosiloxanes, carbosilanes, polycarbosilanes, carbosiloxanes, polycarbosiloxanes and polysilylenedisiloxanes are those which have a boiling point under normal pressure above 160° C. Compounds which are preferably employed are silanes, such as tetraorganosilanes $SiR_4$, silicic acid esters $Si(OR')_4$, organoorganoxysilanes $SiR_n(OR')_{4-n}$, where n=1 to 3, polysilanes of the general formula $R_3Si(SiR_2)_nSiR_3$ where n=0 to 500, preferably 0 to 8, and oligosiloxanes of the general formula $R_3SiO(SiR_2O)_nSiR_3$ where n=0 to 4, in which R' represents identical or different alkyl radicals or alkoxyalkylene radicals having 1 to 4 C atoms, and preferably denotes methyl or ethyl, and R is identical or different and denotes branched or unbranched alkyl radicals having 1 to 22 C atoms, cycloalkyl radicals having 3 to 10 C atoms, alkylene radicals having 2 to 4 C atoms, or aryl, aralkyl or alkylaryl radicals having 6 to 18 C atoms, it also being possible for the radicals R mentioned to be substituted by halogens, such as F or Cl, or by ether, thioether, ester, amide, nitrile, hydroxyl, amine, carboxyl, sulfonic acid, carboxylic acid anhydride and carbonyl groups, and in which, in the case of the polysilanes and oligosiloxanes, R can also have the meaning OR'.

Particularly preferred silicon compounds are, for example, tetraethoxysilane, methyltripropoxysilane, methyltri(ethoxyethoxy) silane, vinyltri(methoxyethoxy)silane, (meth)macryloxypropyltriethoxy- or -trimethoxysilane, γ-chloropropyltriethoxysilane, β-nitriloethyltriethoxysilane, mercaptopropyltriethoxy- or -trimethoxysilane, phenyltriethoxysilane, iso-octyltriethoxysilane, dipropyldiethoxysilane, methylphenyldiethoxysilane, diphenyldimethoxysilane, methylvinyltri(ethoxyethoxy) silane and di- and/or trisiloxanes thereof. Hexamethyldiethoxytrisiloxane, octamethylcyclotetrasiloxane, tetramethyldiethoxydisilane, trimethyltrimethoxydisilane, dimethyltetramethoxydisilane, or condensation products thereof, and pentamethyldisilanedisiloxane may furthermore be mentioned. The silicon compounds mentioned can be employed by themselves or as a mixture.

The organosilicon compounds can be prepared by processes such as are described in Noll, Chemie und Technologie der Silicone [Chemistry and technology of the silicones], 2nd edition 1968, Weinheim and in HoubenWeyl, Methoden der organischen Chemie [Methods of organic chemistry], Volume E20, page 1782 et seq., 2219 et seq., Georg Thieme Verlag, Stuttgart, 1987.

The water-dispersible organosilicon compounds are preferably present in an amount of 0.5 to 15% by weight, based on the organopolymer content.

The silicon compounds are preferably added in the form of an emulsion to the organopolymer dispersion to be sprayed. The protective colloids below, if appropriate in combination with suitable emulsifiers, are preferably used for the emulsification. Possible emulsifiers here are both anionic and cationic as well as nonionic emulsifiers. Those which are not soluble in the protective colloid and have relative molecular weights, in contrast to the protective colloids, of less than 2000 are preferred. Suitable emulsifiers are known to the expert and are to be found, for example, in Houben-Weyl, Methodem der organischen Chemie [Methods of organic chemistry], Volume XIV, 1, Makromolekulare Stoffe [Macromolecular substances], Georg Thieme Verlag, Stuttgart, 1961, 192208. The emulsifiers are as a rule employed in amounts of up to 5% by weight, based on the silicon compounds. The amount is preferably <1% by weight, based on the organopolymers.

In a preferred embodiment, the dispersion powder composition comprises 8 to 50% by weight, preferably to 25% by weight, of protective colloid, based on the total amount of water-insoluble organopolymer and silicon compound. Suitable protective colloids are, for example, polyvinyl alcohols and derivatives thereof; polysaccharides in water-soluble form, such as starches (amylose and amylopectin), cellulose, guar, tragacanthic acid, dextran, alginates and carboxymethyl, methyl, hydroxyethyl and hydroxypropyl derivatives thereof; proteins, such as casein, soya protein and gelatin; synthetic polymers, such as poly(meth)acrylic acid, poly(meth)acrylamide, polyvinylsulfonic acids and water-soluble copolymers thereof; melamine-formaldehydesulfonates, naphthalene-formaldehydesulfonates, and styrene/maleic acid and vinyl ether/maleic acid copolymers.

Further constituents of the dispersion powder composition which preferred embodiments comprise are antiblocking agents, such as Ca carbonate or Mg carbonate, talc, gypsum, silicic acid and silicates having particle sizes preferably in the range from 10 nm to 10 µm.

The dispersion powder composition is prepared by means of spray drying. Drying is carried out here in the customary spray drying units, it being possible for the atomization to be effected by means of one-, two- or multi-comoonent nozzles or with a rotating disc. The discharge temperature is in general chosen in the range from 55° C. to 100° C., preferably 70° C. to 90° C., depending on the unit, the Tg of the resin and the desired degree of drying.

A mixture of the polymer dispersion, preferably having a solids content of 20 to 60%, and the emulsion or, if appropriate, dispersion of the silicon compound, preferably having a solids content of 20 to 50%, if appropriate after addition of further auxiliaries, can be sprayed and dried together in the spray drying. Particles which comprise the water-insoluble organopolymer particles and the particles of the silicon compound in a matrix of water-soluble protective colloid are obtained here.

As an alternative to this procedure, the aqueous organopolymer dispersion and the aqueous emulsion or, if appropriate, dispersion of the silicon compound can be sprayed through separate nozzles and dried together in the spray tower, if appropriate after addition of further auxiliaries. With this procedure, the organopolymer particles and the particles of the silicon compounds are usually present as separate particles.

The dispersion powder composition can be employed in the typical fields of use. For example, in chemical building products in combination with inorganic, hydraulically setting binders, such as cements (Portland, aluminate, trass, Hüllen, magnesia or phosphate cement), gypsum or waterglass, for the preparation of building adhesives, plasters, stopper compositions, flooring stopper compositions, joint mortars and paints. Furthermore as sole binders for coating compositions and adhesives or as binders for textiles. The dispersion powder composition is preferably employed as a hydrophobizing binder in fields of use where, in addition to good adhesion, a reduced uptake of water and/or a water-repellent effect is desired.

EXAMPLES

Preparation of the dispersion powder compositions:

The atomization in Examples 1 to 4 and in the Comparison Example was carried out in a Nubilosa spray drier:
intake temperature: 100–130° C.
discharge temperature: 65–90° C.
compressed air pressure before
the two-component nozzle: 4 bar
solids content of the dispersions: about 33%

Example 1

A mixture was prepared from a vinyl acetate/ethylene copolymer dispersion (LL 485 from Wacker-Chemie GmbH, solids content about 50%), an aqueous emulsion of isooctyltriethoxysilane (content about 35%), the amount of silane being 2.5% by weight, based on the copolymer, and 8.5% by weight, based on the total amount of copolymer and silane, of a protective colloid (polyvinyl alcohol W 25/140 from Wacker-Chemie GmbH). This mixture was dried using the above operating data. 10% by weight, based on the total weight of polymeric constituents, of a commercially available antiblocking agent (mixture of Ca/$MgCO_3$ and Mg hydrosilicate) was added to the powder thus obtained.

Example 2

The procedure was analogous to Example 1, with the difference that the mixture comprised 4.1% by weight of isooctyltriethoxysilane. The powder thus obtained was very readily free-flowing and redispersible.

Example 3

A mixture was prepared analogously to Example 1 from a styrene/butyl acrylate copolymer dispersion (LL 476 from Wacker-Chemie GmbH) an aqueous emulsion of isooctyltriethoxysilane, the amount of silane being 2.1% by weight, based on the copolymer, and 8.3% by weight, based on the total amount of copolymer and silane, of a protective colloid (polyvinyl alcohol W 25/140 from Wacker-Chemie GmbH). This mixture was dried using the above operating data. 10% by weight, based on the total weight of polymeric constituents, of a commercially available antiblocking agent (mixture of Ca/$MgCO_3$ and Mg hydrosilicate) was added to the powder thus obtained.

Example 4

The procedure was analogous to Example 3, with the difference that the mixture comprised 4.2% by weight of isooctyltriethoxysilane. The powder thus obtained was very readily free-flowing and redispersible.

Comparison Example 1

The procedure was analogous to Example 1, with the difference that no silane was added to the mixture.
Use test:
The products prepared in Examples 1 to 4 and in comparison Example 1 were employed in the following joint filler and complete thermal insulation recipe:
Joint filler recipe:
300.0 parts of Portland cement PZ 35 F
40.0 parts of aluminate cement (HAC-Fondu Lafarge)
649.5 parts of quartz sand (0.1–0.4 mm)
0.5 part of Culminal C 8556
10.0 parts of dispersion powder
200 ml of water per 1000 g of dry mixture
Complete thermal insulation recipe (building adhesive):
280.0 parts of Dykerhoff white cement
500.0 parts of quartz sand (0.1–0.4 mm)
190.0 parts of Jura beads MHS
1.5 parts of Tylose BA 2741
20.0 parts of dispersion powder
20.0 parts of water
Testing of the joint filler recipe:
The flexural tensile strength and compressive strength of cement compositions prepared with these recipes were tested in accordance with DIN 1164.
The water uptake coefficient was determined in accordance with DIN 52617.

The specimens were stored in a standard climate (23° C./50% relative atmospheric humidity) for 14 days.

The processability was evaluated qualitatively.

The results of testing are summarized in Table 1.

Testing of the building adhesive recipe:

The adhesive strength was determined with a peel-off rate of 250N/s after storage in the dry state for 14 days.

For the water drop test, 0.5 ml of water was applied with a pipette to the surface of the adhesive composition applied to Styropor and the time taken for the drop to be absorbed was measured.

The results of testing are summarized in Table 2.

The test results of Table 1 and Table 2 show that the dispersion powder compositions according to the invention have a hydrophobizing action without adversely changing the mechanical properties here. In contrast to hydrophobizing agents, such as stearates or oleates, which are added subsequently to powder mixtures, wetting of the dry mortar with water is not delayed, but takes place immediately.

TABLE 1

(Testing of the joint filler recipe)

| Example | 1 | 2 | 3 | 4 | Comp. Ex. 1 |
|---|---|---|---|---|---|
| Water uptake ($kg/m^2 \times h^{0.5}$) | 0.25 | 0.20 | 0.32 | 0.13 | 0.76 |
| Flexural tensile strength ($N/mm^2$) | 4.6 ± 0.4 | 4.5 ± 0.2 | 5.7 ± 0.2 | 5.1 ± 0.4 | 4.9 ± 0.3 |
| Compressive strength ($N/mm^2$) | 16.9 ± 0.4 | 16.0 ± 0.3 | 18.0 ± 0.4 | 18.3 ± 0.5 | 17.4 ± 0.5 |
| Processability | somewhat tacky | somewhat tacky | very good | very good | somewhat tacky |

TABLE 2

(Testing of the adhesive recipe on polystyrene sheets)

| Example | 1 | 2 | 4 | Comp. Ex. 1 |
|---|---|---|---|---|
| Adhesive strength ($N/mm^2$) | 0.1 100% Styropor torn out | 0.11 100% Styropor torn out | 0.1 100% Styropor torn out | 0.11 70% Styropor torn out |
| Water drop test | 135 min | 360 min | 360 min | 5 min |

What is claimed is:

1. A process for the preparation of a dispersion powder composition which is redispersible in water and is based on at least one water-insoluble film-forming organopolymer, said organopolymer being selected from the group consisting of:
   (a) vinyl ester homo- or copolymers containing at least one monomer unit selected from the group consisting of vinyl esters of unbranched or branched alkylcarboxylic acids having 1 to 15 C atoms;
   (b) (meth)acrylic acid ester homo- or copolymers containing at least one monomer unit selected from the group consisting of methacrylic acid esters and acrylic acid esters of alcohols having 1 to 10 C atoms;
   (c) homo- or copolymers of fumaric and/or maleic acid mono- or diesters of unbranched or branched alcohols having 1 to 12 C atoms;
   (d) homo- or copolymers of dienes, and of olefins;
   (e) homo- or copolymers of vinyl aromatics; and
   (f) homo- or copolymers of vinyl-halogen compounds;
   wherein the powder composition comprises 0.1 to 30% by weight, based on the organopolymer content, of at least one water-dispersible silicon compound having a boiling point under normal pressure of >160° C. and selected from the group consisting of carbosilanes, carbosiloxanes, tetraorganosilanes, silicic acid esters $Si(OR')_4$, organoorganoxysilanes, $SiR_n(OR')_{4-n}$ where n=1 to 3, polysilanes of the formula $R_3Si(SiR_2)_nSiR_3$, where n=0 to 8 and oligosiloxanes of the formula $R_3SiO(SiR_2O)_nSiR_3$, where n=0 to 4 in which R' represents identical or different alkyl radicals or alkoxyalkylene radicals having 1 to 4 C atoms, and R is identical or different, substituted or unsubstituted and denotes branched or unbranched alkyl radicals having 1 to 22 C atoms, cycloalkyl radicals having 3 to 10 C atoms, aryl, aralkyl or alkylaryl radicals having 6 to 18 C atoms, or halogens, ether, thio-ether, ester, amide, nitrile, hydroxyl, amine, carboxyl, sulfonic acid, carboxylic acid anhydride and carbonyl groups, and in which, in the case of the polysilanes and oligosiloxanes, R can also have the meaning OR', said process consisting of spray drying (1) a dispersion of the organopolymer and optionally auxiliary compounds and (2) an emulsion or dispersion of the silicon compound and optionally, auxiliary compounds, through separate nozzles and drying together in a spay tower.

2. A process for the preparation of a dispersion powder composition which is redispersible in water and is based on at least one water-insoluble film-forming organopolymer, said organopolymer being selected from the group consisting of:
   (a) vinyl ester homo- or copolymers containing at least one monomer unit selected from the group consisting of vinyl esters of unbranched or branched alkylcarboxylic acids having 1 to 15 C atoms;
   (b) (meth)acrylic acid ester homo- or copolymers containing at least one monomer unit selected from the group consisting of methacrylic acid esters and acrylic acid esters of alcohols having 1 to 10 C atoms;
   (c) homo- or copolymers of fumaric and/or maleic acid mono- or diesters of unbranched or branched alcohols having 1 to 12 C atoms;
   (d) homo- or copolymers of dienes, and of olefins;
   (e) homo- or copolymers of vinyl aromatics; and
   (f) homo- or copolymers of vinyl-halogen compounds;
   wherein the powder composition comprises 0.1 to 30% by weight, based on the organopolymer content, of at least one water-dispersible silicon compound having a boiling point under normal pressure of >160° C. and selected from the group consisting of carbosilanes, carbosiloxanes, tetraorganosilanes, silicic acid esters $Si(OR')_4$, organoorganoxysilanes, $SiR_n(OR')_{4-n}$ where n=1 to 3, polysilanes of the formula $R_3Si(SiR_2)_nSiR_3$, where n=0 to 8 and oligosiloxanes of the formula $R_3SiO(SiR_2O)_nSiR_3$, where n=0 to 4 in which R' represents identical or different alkyl radicals or alkoxyalkylene radicals having 1 to 4 C atoms, and R is identical or different, substituted or unsubstituted and denotes branched or unbranched alkyl radicals having 1 to 22 C atoms, cycloalkyl radicals having 3 to 10 C atoms, aryl, aralkyl or alkylaryl radicals having 6 to 18 C atoms, or halogens, ether, thio-ether, ester, amide, nitrile, hydroxyl, amine, carboxyl, sulfonic acid, carboxylic acid anhydride and carbonyl groups, and in which, in the case of the polysilanes and oligosiloxanes, R can also have the meaning OR', said process consisting of spraying and drying together, a mixture of a dispersion of the organopolymer, an emulsion or dispersion of the silicon compound and, optionally, auxiliary compounds.

* * * * *

UNITED STATES PATENT AND TRADEMARK OFFICE
CERTIFICATE OF CORRECTION

PATENT NO. : 6,191,235 B1  
DATED : February 20 2001  
INVENTOR(S) : Herbert Eck et al.

Page 1 of 1

It is certified that error appears in the above-identified patent and that said Letters Patent is hereby corrected as shown below:

Title page,
Item [30], "Foreign Application Priority Data" should read,
-- January 27, 1994   (DE)..............................P 44 02 409.6 --

Signed and Sealed this

Eighth Day of January, 2002

*Attest:*

JAMES E. ROGAN
*Attesting Officer*    *Director of the United States Patent and Trademark Office*